(12) United States Patent
Ozeki et al.

(10) Patent No.: US 7,617,894 B2
(45) Date of Patent: Nov. 17, 2009

(54) CONTROL MECHANISM AND DISPLAY FOR HYBRID VEHICLE

(75) Inventors: Takashi Ozeki, Saitama (JP); Yoshiaki Tsukada, Saitama (JP); Hiroyuki Kojima, Saitama (JP); Hiroaki Uchisasai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 480 days.

(21) Appl. No.: 11/357,071

(22) Filed: Feb. 21, 2006

(65) Prior Publication Data
US 2006/0185917 A1    Aug. 24, 2006

(30) Foreign Application Priority Data
Feb. 22, 2005    (JP)    ............... 2005-044958
Mar. 16, 2005    (JP)    ............... 2005-074886

(51) Int. Cl.
*B60K 6/20* (2007.10)
(52) U.S. Cl. .............. 180/65.21; 180/65.1; 180/65.265; 180/65.275; 180/65.28; 180/65.285
(58) Field of Classification Search ..... 180/65.1–65.29; 903/903, 907, 921, 922, 926, 930, 940, 941, 903/942, 943
See application file for complete search history.

(56) References Cited

U.S. PATENT DOCUMENTS

| | | | | |
|---|---|---|---|---|
| 4,021,677 A | * | 5/1977 | Rosen et al. | ............. 290/40 R |
| 5,176,213 A | * | 1/1993 | Kawai et al. | ................ 180/243 |
| 5,515,937 A | * | 5/1996 | Adler et al. | ................ 180/65.2 |
| 5,697,466 A | * | 12/1997 | Moroto et al. | ............ 180/65.2 |
| 5,713,814 A | * | 2/1998 | Hara et al. | ..................... 477/5 |
| 5,886,416 A | * | 3/1999 | Arai | ......................... 290/40 C |
| 6,018,198 A | * | 1/2000 | Tsuzuki et al. | ............... 290/17 |
| 6,218,804 B1 | * | 4/2001 | Toriyama et al. | ............ 320/104 |
| 6,276,481 B1 | * | 8/2001 | Matsuto et al. | ............ 180/220 |
| 6,278,915 B1 | * | 8/2001 | Deguchi et al. | ............... 701/22 |
| 6,330,498 B2 | * | 12/2001 | Tamagawa et al. | ........... 701/22 |
| 6,344,008 B1 | * | 2/2002 | Nagano et al. | ................. 475/1 |
| 6,371,889 B1 | * | 4/2002 | Kuroda et al. | ............... 477/181 |

(Continued)

FOREIGN PATENT DOCUMENTS

JP    2000-46587 A    2/2000

(Continued)

*Primary Examiner*—Christopher P Ellis
*Assistant Examiner*—Jacob Meyer
(74) *Attorney, Agent, or Firm*—Birch, Stewart, Kolasch & Birch, LLP

(57) ABSTRACT

A control mechanism for a hybrid vehicle having a motor driving means enabling its running through an output of an electric motor, and an engine driving means enabling its running through an output of an engine, includes a throttle sensor and a driving change-over control unit having a mode map for determining each of working regions M, E of the motor driving unit and the engine driving unit in response to a sensing signal θ of the throttle sensor. The mode map is provided with a critical region Ma adjacent to the working region E of the engine driving unit in the working region M of the motor driving unit and an informing unit (display device) to inform a driver of a fact that the motor driving unit is being operated in the critical region Ma. The display device also indicates a battery residual amount.

20 Claims, 12 Drawing Sheets

U.S. PATENT DOCUMENTS

| | | | |
|---|---|---|---|
| 6,441,506 B2 * | 8/2002 | Nakashima | 290/40 C |
| 6,480,775 B2 * | 11/2002 | Cho | 701/51 |
| 6,581,707 B2 * | 6/2003 | Morimoto et al. | 180/65.3 |
| 6,591,925 B2 * | 7/2003 | Raftari et al. | 180/65.3 |
| 7,110,877 B2 * | 9/2006 | Ozeki et al. | 701/112 |
| 7,145,261 B2 * | 12/2006 | Kojima et al. | 290/40 C |
| 7,303,504 B2 * | 12/2007 | Uchisasai et al. | 477/5 |
| 7,343,994 B2 * | 3/2008 | Wakitani et al. | 180/65.4 |
| 7,392,870 B2 * | 7/2008 | Kojima et al. | 180/65.2 |
| 7,520,351 B2 * | 4/2009 | Uchisasai et al. | 180/65.245 |
| 2001/0052433 A1 * | 12/2001 | Harris et al. | 180/68.5 |
| 2002/0020571 A1 * | 2/2002 | Morimoto et al. | 180/65.3 |
| 2003/0051929 A1 * | 3/2003 | Raftari et al. | 180/65.3 |
| 2004/0254039 A1 * | 12/2004 | Yasui et al. | 475/5 |
| 2005/0019173 A1 * | 1/2005 | Wakitani et al. | 417/313 |
| 2006/0065239 A1 * | 3/2006 | Tsukada et al. | 123/396 |
| 2006/0180363 A1 * | 8/2006 | Uchisasai et al. | 180/65.2 |
| 2006/0289212 A1 * | 12/2006 | Haruhisa | 180/65.2 |
| 2008/0303529 A1 * | 12/2008 | Nakamura et al. | 324/433 |

FOREIGN PATENT DOCUMENTS

| | | |
|---|---|---|
| JP | 2000-320364 A | 11/2000 |

* cited by examiner

| Battery residual amount | During charging | During discharging |
|---|---|---|
| $E > E_{ref1}$ | Off | Off |
| $E_{ref1} \geq E \geq E_{ref2}$ | On (green) | On (red) |
| $E_{ref2} > E$ | Off | Off |

CONTROL MECHANISM AND DISPLAY FOR HYBRID VEHICLE

CROSS-REFERENCE TO RELATED APPLICATION

The present application claims priority under 35 U.S.C. §119 to Japanese Patent Application No. 2005-044958, filed Feb. 22, 2005, and Japanese Patent Application No. 2005-074886, filed Mar. 16, 2005, the entire contents of which are hereby incorporated by reference.

BACKGROUND OF THE INVENTION

1. Field of the Invention

This invention relates to an improvement over a control mechanism and display for a hybrid vehicle having a motor driving means enabling a running of the vehicle through an output of an electrical motor, and an engine driving means enabling a running of the vehicle through an output of an engine. The invention includes a throttle sensor for sensing an opening degree of a throttle valve of the engine, a driving change-over control means having a mode map for determining each of working regions of the motor driving means and the engine driving means in response to a sensing signal of the throttle sensor, and a display device for informing a driver that the motor driving means is being operated in the critical region Ma, and for displaying a battery residual amount.

2. Description of Background Art

Such a control mechanism for a hybrid-type vehicle as described above has already been known in the art as disclosed, for example, in JP-A No. 320364/2000.

The prior art control mechanism for a hybrid-type vehicle as above shows that a driving operation for positively holding an operating state of the motor driving means to continue a motor running mode because when a specified condition is set during operation of the motor driving means, i.e. during the motor running mode, the operation is changed over automatically to an operation of the engine driving means without any notice and becomes an engine running mode.

Further, it is desired in the electric vehicle running under a driving force of a motor, or a hybrid-type vehicle having an engine associated with the motor (hereinafter totally expressed as an electric vehicle) that there is provided a configuration capable of accurately acknowledging its status because its distance that it can run is dependent on a charging residual amount of the battery. In view of this fact, Japanese Patent Document JP-A No. 46587/2000 a technology in which both an electrical power supplied from the battery to the running motor and consumption electrical power of the motor are displayed at a display panel at a driver's seat with a practical numerical value.

A more certain care is needed against the status of a battery during its discharging operation than during its charging operation. However, the aforesaid prior art needed to judge it by deciding whether or not the battery is kept in its charged status or in its discharged status that a code of "minus (−)" is applied in front of a numerical value displayed at the display panel or not. Due to this fact, there occurs a possibility that a riding person hardly acknowledges a status of the battery unless the riding person stares at the displayed value.

In addition, it is not necessary to pay a special attention to the status of a battery if the battery has a sufficient residual amount of charge even in the state that the battery is being discharged. However, there occurs a possibility that the riding person is always forced to monitor the battery because the consumption power or the like of the motor in the prior art described above is always continued to be displayed without having any relation with the residual charging amount of the battery.

Further, when the charging or discharging status of the battery was tried to be displayed practically through its numerical value as found in the prior art, a circuit for detecting quantitatively an electrical power supplied from the battery to the running motor and the consumption power of the running motor and a display unit for converting the result of detection into a practical numerical value data and displaying it was needed, resulting in that they had a technical problem that the number of component parts was increased or a size of the device was increased, they reflected to increase its price and this device became expensive.

SUMMARY AND OBJECTS OF THE INVENTION

This invention has been invented in reference to the aforesaid circumstances as above and it is an object of this invention to provide the aforesaid control mechanism for a hybrid-type vehicle in which a state just before changing-over from an operation of the motor driving means to an operation of the engine driving means is acknowledged by a driver when the vehicle is set at that state, the driver keeps the operating condition of the motor driving means by maintaining the operating condition of the motor driving means so as to enable the motor running mode to be carried out.

Another object of this invention is to provide a display device for an electric vehicle having an indicator capable of acknowledging a state of the battery through a direct sensitive manner and an easy way by a simple configuration.

In order to accomplish the aforesaid objects, this invention has a first feature in a control mechanism for a hybrid-type vehicle comprising a motor driving means enabling a running of the vehicle through an output of an electric motor, an engine driving means enabling a running of the vehicle through an output of an engine, a throttle sensor for sensing an opening degree of a throttle valve of the engine, and a driving change-over control means having a mode map for determining each of working regions of the motor driving means and the engine driving means in response to a sensing signal of the throttle sensor that said mode map is provided with a critical region adjacent to the working region of the engine driving means in the working region of the motor driving means and there is provided an informing means for informing the driver of a fact that the motor driving means is operated in the critical region.

In addition to the first feature, this invention has a second feature that said mode map is constituted for determining each of the working regions of the motor driving means and the engine driving means in reference to a throttle valve opening speed calculated from the sensing signal in addition to the sensing signal of the throttle sensor.

Further, in addition to the first or second feature, this invention has a third feature that the driving change-over control means detects a residual capacity of a battery and informs it to a driver through said informing means when it is determined that the residual capacity approaches to a lower limit value enabling an operation of the motor driving means.

Further, in addition to the third feature, this invention has a fourth feature that the driving change-over control means is constituted such that the driving change-over control means automatically changes it to an operation of the engine driving means when it is determined that the residual capacity of the battery is decreased down the lower limit value enabling the operation of the motor driving means even under an operation of the motor driving means.

Further, the informing means corresponds to a display device 120 in the preferred embodiment of this invention to be described later.

Further, this invention includes the following additional features of the display device for an hybrid vehicle comprising a battery for supplying a driving current to a running motor and charging a regenerative current from the motor, a charging and discharging status monitoring means for monitoring a charging and discharging status for the battery and an indicator emitting light in response to the charging and discharging status, for example:

(1) an indicator of the display device can selectively emit light of at least two colors, and there is provided a light emitting control means to cause the indicator to emit light with a first color if the battery is being charged and to cause the indicator to emit light with a second color if the battery is being discharged;

(2) there is further provided a battery residual amount monitoring means for monitoring a residual charged amount of the battery, and the light emitting control means performs the light emitting control when the charging residual amount of the battery is in a specified range;

(3) a light emitting control means illuminates to emit light of the indicator with the second color when the battery is being discharged and a duty ratio of the illumination light emitting is varied in response to the charging residual amount of the battery;

(4) a light emitting control means illuminates to emit light of the indicator with the first color when the battery is being charged and a duty ratio of the illumination light emitting is varied in response to the charging residual amount of the battery; and (5) a duty ratio of the illumination emitted light is varied in a stepwise manner in response to the charging residual amount of the battery.

According to the first feature of this invention, when an operation of the motor driving means enters the critical region just before being changed over to an operation of the engine driving means, its state is informed to a driver through the informing means, so that the driver can acknowledge the state. Then, if the driver keeps at least an opening degree of the throttle valve at that time on the basis of its acknowledgement, it is possible to keep the operation of the motor driving means and continue the motor running mode.

In addition, according to the second feature of this invention, it is possible to reflect a driver's intention for changing-over an operation between the motor driving means and the engine driving means because each of the working regions of the motor driving means and the engine driving means is determined in reference to a throttle valve opening speed calculated in response to a detecting signal of the throttle sensor.

Further, according to the third feature of this invention, it is possible to cause its state to be acknowledged by a driver through the informing means when a residual capacity of the battery approaches to the lower limit value enabling the operation of the motor driving means to be carried out.

Still further, according to the fourth feature of this invention, it is possible to restrict an excessive electrical discharging of the battery and to prevent a state of residual capacity of the battery from becoming zero in advance because an operation of the motor driving means can be changed over automatically to an operation of the engine driving operation when the residual capacity of the battery becomes less than a lower limit value enabling an operation of the motor driving means to be carried out even under an operation of the motor driving means.

Further still, according to the features of the display device of is invention, the following effects have been attained.

(1) The charging and discharging status of the battery can be acknowledged instinctively by a simple configuration because light emitting colors of the indicator are made different in response to whether or not the battery is in charged state or in a discharged state.

(2) A riding person can be released from a monitoring of the battery when the monitoring of battery is not required if the light emitting control is not carried put under an insufficient charging residual amount of the battery because the light emitting control causing the light emitting colors of the indicator to be made different in response to a charging and discharging state of the battery is carried out only when the charging residual amount of the battery is set only in a predetermined range.

(3) A riding person can acknowledge it in simultaneous with the residual charging amount instinctively that the battery is being discharged because an illumination duty ratio of the indicator is varied in response to the residual charging amount of the battery if the battery is being discharged.

(4) A riding person can acknowledge it in simultaneous with the residual charging amount instinctively that the battery is being charged because an illumination duty ratio of the indicator is varied in response to the residual charging amount of the battery if the battery is being charged.

(5) It is possible to simplify a circuit configuration for changing a duty ratio because the number of setting the duty ratio of the illumination emitting light is adjusted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
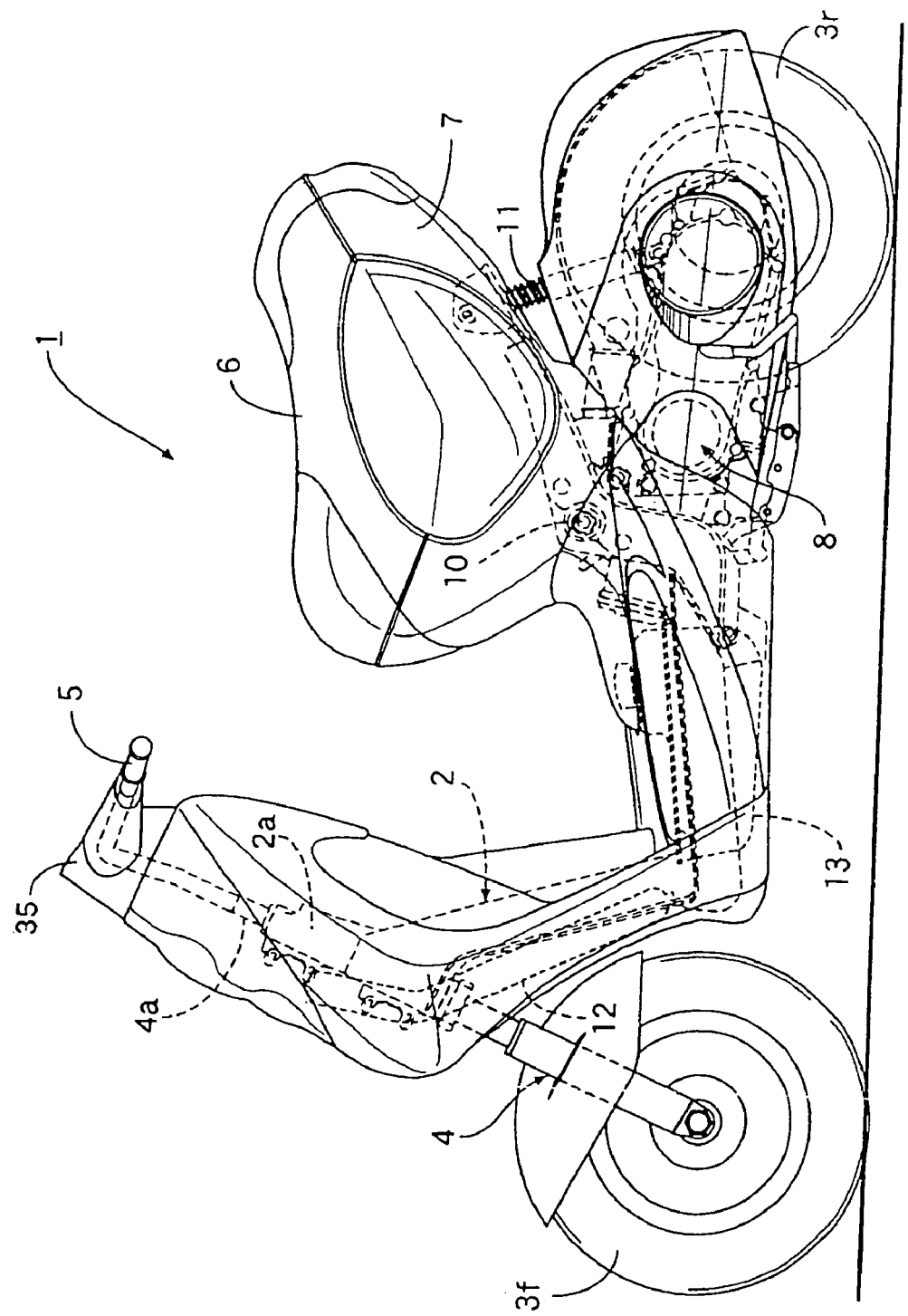
FIG. 1 is a side elevational view for showing the hybrid-type motorcycle according to the first preferred embodiment of this invention.

At first, in FIG. 1, a chassis frame 2 of a scooter-type motorcycle 1 constituted in a hybrid-type supports a front fork 4 supporting a front wheel 3f by a head pipe 2a at its front end in such a manner as it can be steered, and a steering handlebar 5 is connected to a steering stem 4a of the front fork 4 extending upward of the head pipe 2a. A luggage box 7 having a driver's seat 6 at its upper surface and a power unit 8 positioned below the luggage box 7 are fixed to the rear part of the chassis frame 2, and a rear wheel 3r driven by the output of the power unit 8 is pivoted at the rear end of the power unit.

The power unit 8 can be oscillated in an upward or downward direction around a pivot shaft 10 for supporting its front end at the chassis frame 2, and a rear cushion 11 for dampening its oscillation is fixed between the chassis frame 2 and the rear end of the power unit 8. In addition, the chassis frame 2 has at its front part a battery 12 fixed thereto and at its intermediate part a fuel tank 13.

Figure 2:
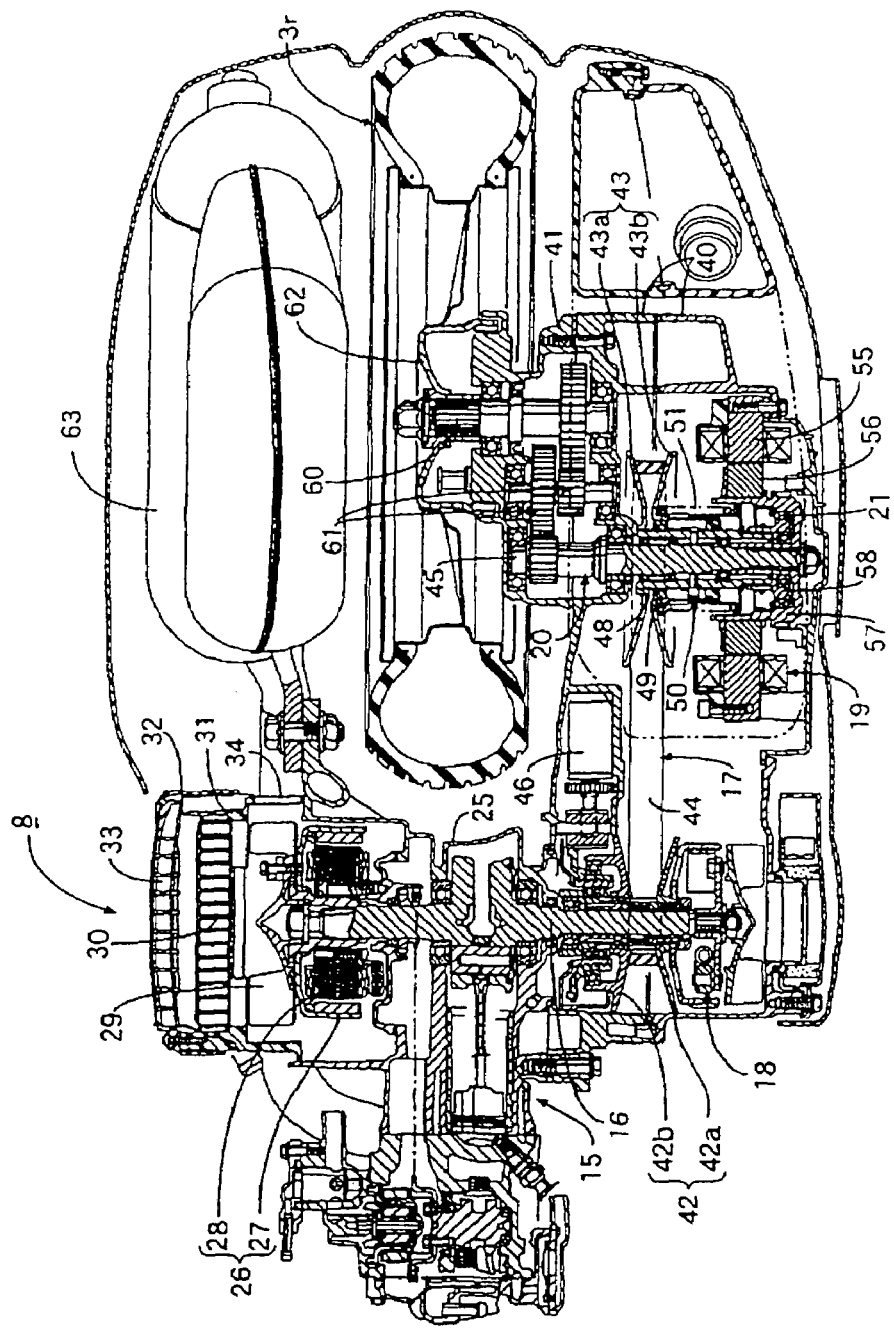
FIG. 2 is a top plan view in longitudinal section for showing a power unit of the hybrid-type motorcycle.

As shown in FIG. 2, the power unit 8 comprises a water-cooled single cylinder type 4-cycle engine 15, a V-belt type continuously variable transmission 17 connected to a crank shaft 16 of this engine 15, a starting clutch 18 installed between the crank shaft 16 and the continuously variable transmission 17, an electric motor 19, a transmission device 20 capable of transmitting an output of the electric motor 19 to the rear wheel 3r, and a one-way clutch 21 installed between the continuously variable transmission 17 and the transmission device 20.

The crank shaft 16 of the engine 15 is supported at the crank case 25 under a state in which its axis is directed toward the lateral direction of the motorcycle 1. An outer rotor 27 is fixed to the right end of the crank shaft 16 protruded out of the right end wall of the crank case 25, an inner stator 28 enclosed by the outer rotor 27 is fixed to the crank case 25 and then a self-dynamo 26 is constituted by these outer rotor 27 and inner stator 28. This self-dynamo 26 acts as a starter motor cranking the crank shaft 16 when the engine is started to operate, and performs a function for generating electricity during operation of the engine 15.

A cooling fan 29 is fixed to the right end of the crank shaft 16 outside the self-dynamo 26, and a radiator 30 is arranged at a position where the cooling fan 29 is held between it and the self-dynamo 26. This radiator 30 is fixed to the crank case 25 through a shroud 31 enclosing the cooling fan 29. In addition, the radiator 30 is covered by a radiator cover 32 fixed to the shroud 31, and a grill 33 for use in feeding the surrounding atmosphere as cooling air by the cooling fan 29 is connected to this radiator cover 32 while being oppositely faced against the radiator 30. Further, an air discharging port 34 for use in discharging the cooling air completed to cool the radiator 30 is arranged at the shroud 31 of the side part of the cooling fan 29.

The continuously variable transmission 17 is stored in a transmission case 40 cooperatively arranged at the left end of the crank case 25 and extending in a rearward direction. In addition, a gear case 41 adjacent to the left side of the rear wheel 3r is cooperatively arranged at the rear part of the transmission cased 40.

This continuously variable transmission 17 is constituted by a driving pulley 42 installed at the left end of the crank shaft 16 protruded into the transmission case 40, a driven pulley 43 installed at an output shaft 45 supported in parallel with the crank shaft 16 and at the transmission case 40 and the gear case 41, and a belt 44 wound around these driving pulley 42 and driven pulley 43.

The driving pulley 42 is constituted by a fixed pulley half member 42a connected to the crank shaft 16 through a starting clutch 18, and a movable pulley half member 42b capable of being moved forward or backward on the crank shaft 16 in respect to the fixed pulley half member 42a. An effective diameter of the driving pulley 42, i.e. a belt winding radius, is adjusted through forwarding or retracting of the movable pulley half member 42b against the fixed pulley half member 42a. A changing electric motor 46 for use in forwarding or retracting the movable pulley half member 42b against the fixed pulley half member 42a is fixed to the transmission case 40.

The starting clutch 18 is constituted by a centrifugal clutch connected under a state in which the number of rotation of the crank shaft 16 is more than a predetermined value, for example, 3000 rpm or more.

The driven pulley 43 is constituted by an inner cylinder 48 rotatably supported at the output shaft 45, an outer cylinder 49 fitted to the inner cylinder 48 in an axial slidable manner, a movable pulley half member 43b fixed to the inner cylinder 48, a fixed pulley half member 43a fixed to the outer cylinder 49 so as to be oppositely faced against this movable pulley half member 43b, a torque cam mechanism 50 arranged between both pulley half members 43a, 43b to generate a thrust force between both pulley half members 43a, 43b in response to a relative rotating angle of both pulley half members 43a, 43b, and a spring 51 arranged to be shrunk between the inner cylinder 48 and the movable pulley half member 43b so as to bias the movable pulley half member 43b toward the fixed pulley half member 43a.

Thus, an effective diameter of the driven pulley 43, i.e. a belt winding radius, is determined in reference to a balanced state of thrust force generated at the torque cam mechanism 50, an axial biasing force of the spring 51 and a tension force of the belt 44. Accordingly, as the effective diameter of the driving pulley 42, for example, is increased, the effective diameter of the driven pulley 43 is automatically decreased and a transmission ratio (a speed reduction ratio) is decreased in a continuous manner.

The electric motor 19 for driving the rear wheel is constituted by an outer stator 55 fixed to the transmission case 40 and an inner rotor 56 connected to the output shaft 45 through a clutch outer 57. One-way clutch 21 described above is placed between the clutch outer 57 and the clutch inner 58 connected to the inner cylinder 48 of the driven pulley 43. This one-way clutch 21 can transmit a rotation of the driven pulley 43 to the output shaft 45 and the inner rotor 56. Accordingly, when the inner rotor 56 drives the output shaft 45 at the time of operating the electric motor 19, rotation of the inner rotor 56 is not transmitted to the driven pulley 43 due to a shut-off action of the one-way clutch 21. The electric motor 19 realizes an electricity generating function when the inner rotor 56 is driven from the driven pulley 43 and charges the battery 12.

A wheel shaft 60 in parallel with the output shaft 45 is rotatably supported at the transmission case 40 and the gear case 41 and a row of speed reduction gears 61 for transmitting a rotation of the output shaft 45 to the wheel shaft 60 under a specified speed reduction ratio is arranged at the gear case 41. A hub 62 of the rear wheel 3r is connected to the right end of the wheel shaft 60 protruded out of the gear case 41. In this way, the transmission device 20 described above is constituted by the output shaft 45, the row of the reduction gears 61 and the wheel shaft 60. In addition, a discharging muffler 63 for the engine 15 is arranged at a side opposite to the transmission case 40 while the rear wheel 3r is being held.

Figure 3:
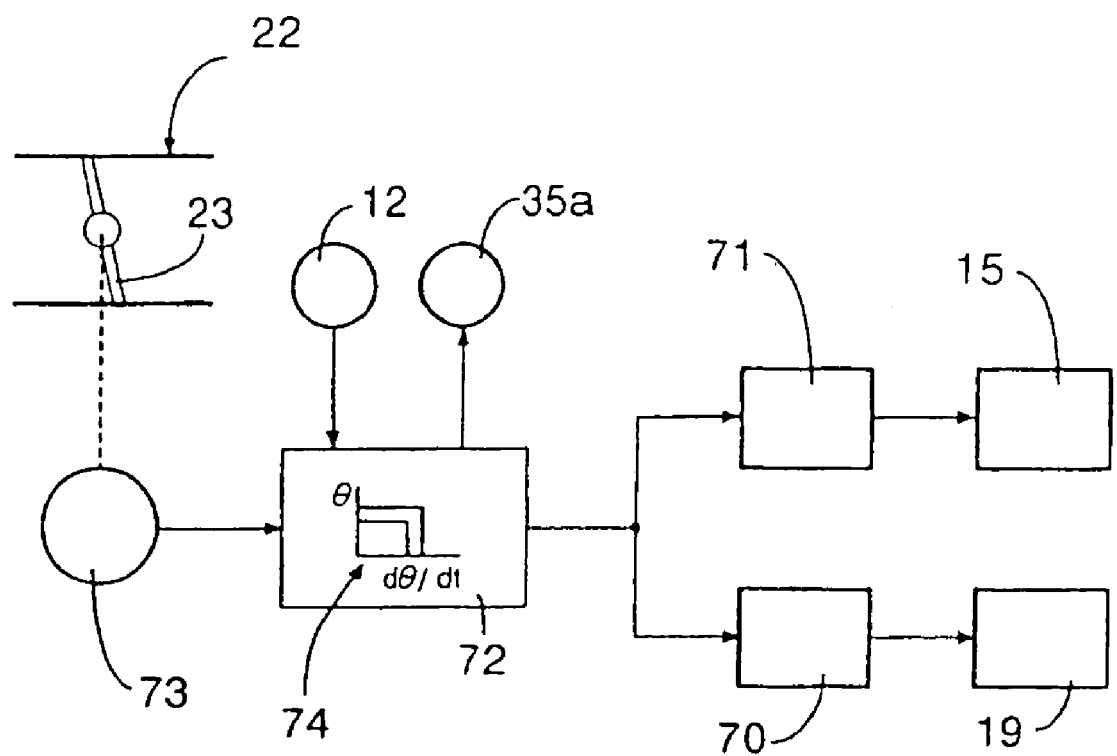
FIG. 3 is a configuration block diagram for showing a control device for the hybrid-type motorcycle.

The motorcycle 1 is provided with the control device of this invention for use in controlling a driving of the rear wheel 3r performed under an operation of the engine 15 and the electric motor 19, and the control device will be described in reference to FIG. 3.

The control device is constituted by a motor driving means 70, an engine driving means 71 and a driving change-over control means 72 for selecting any one of these motor driving means 70 and engine driving means 71. When the motor driving means 70 is operated, an output of the electric motor 19 is controlled by supplying an electrical power of the battery 12 to the electric motor 19 in response to an amount of operation of an accelerator operating member (not shown) of a steering handlebar 5, the motorcycle 1 becomes a motor running mode where the motorcycle runs under an output of the electric motor 19, and in turn when the engine driving means 71 is operated, the engine 15 is started to operate by the self-dynamo 26, the throttle valve 23 at an air intake system 22 of the engine 15 is opened or closed in response to an amount of operation of the accelerator operating member, thereby the output of the engine 15 is controlled and the motorcycle 1 becomes an engine running mode where the motorcycle runs under an output of the engine 15.

A sensing signal of the throttle sensor 73 for use in sensing an opening degree of the throttle valve 23 of the engine 15 is inputted to the driving change-over control means 72. In addition, the driving change-over control means 72 is provided with the mode map 74 for determining each of working regions of the motor driving means 70 and the engine driving means 71.

Figure 4:
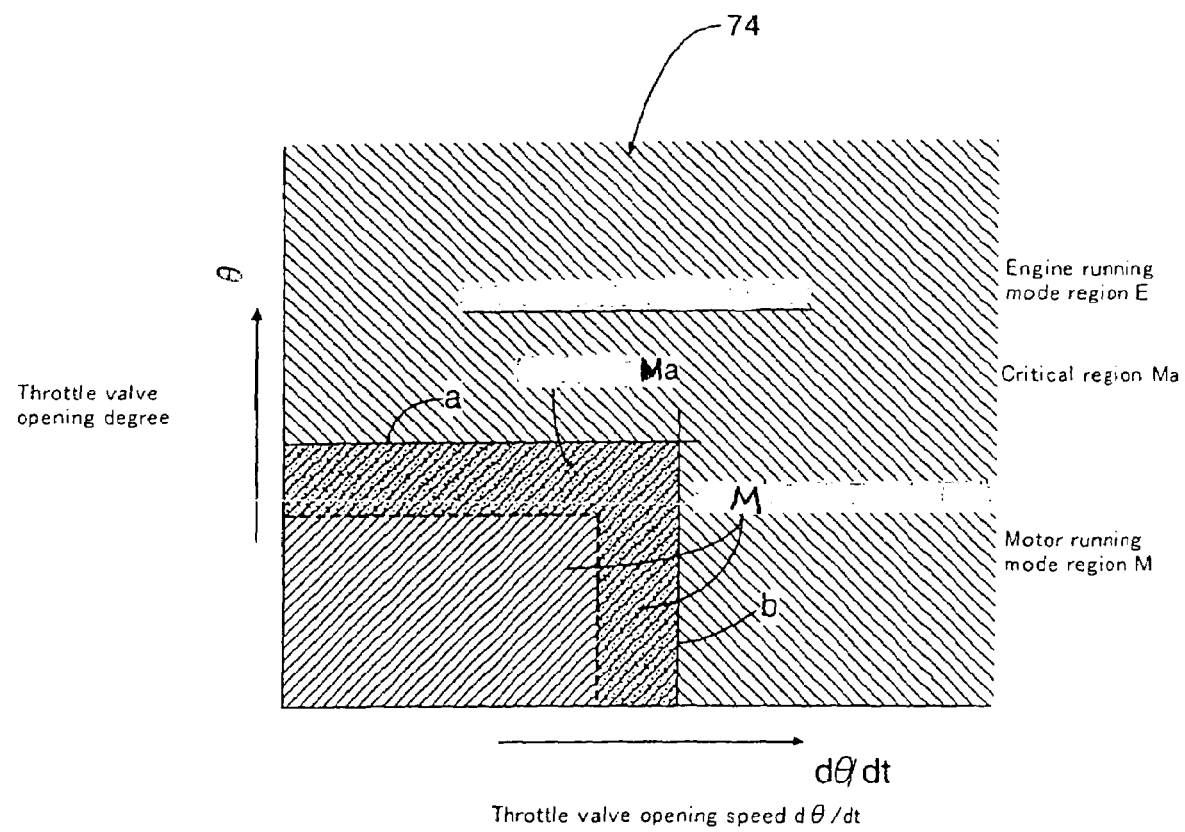
FIG. 4 indicates a mode map arranged at the driving change-over control means in FIG. 3.
Figure 5:
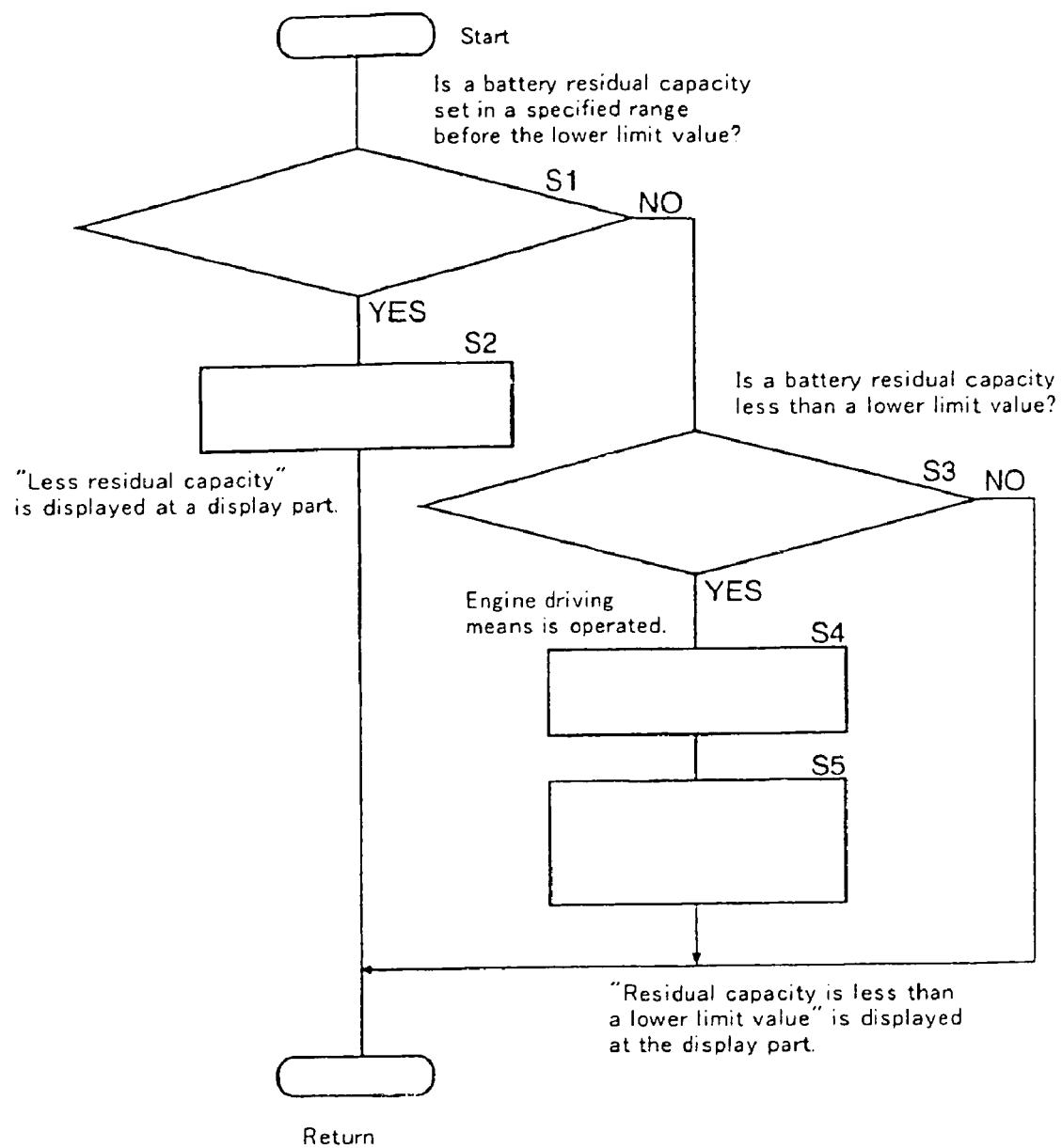
FIG. 5 indicates a flowchart that the driving change-over control means uses.

As shown in FIG. 4, the mode map 74 is set such that a throttle valve opening degree θ indicated by the sensing signal of the throttle sensor 73 is indicated at a vertical axis, a throttle valve opening speed dθ/dt determined through a calculation of the throttle valve opening degree θ is indicated at a lateral axis, an inner region M defined by a predetermined value line (a) of the throttle valve opening degree θ is a motor running mode region where the motor driving means 70 is operated, and an outer region E is an engine running mode region where the engine driving means 71 is operated. The motor running mode region M has a critical region Ma having a predetermined width (b) adjacent to the engine running mode region E, and when the motor driving means 70 is operated in the critical region Ma, the driving change-over control means 72 displays with either a letter or a mark of a description of "just before the engine running state" to the display device 120 of the meter unit 35 arranged at the steering handlebar 5 of the motorcycle. (Other functions of display device 120 will be described in further detail later on with reference to FIGS. 7-13.)

In addition, the driving change-over control means 72 detects a residual capacity of the battery 12 and controls the display device 120 and the engine driving means 71 in response to the flow-chart indicated in FIG. 4. That is, the driving change-over control means 72 advances to a step 2 when it judges at a step 1 that the residual capacity of the battery 12 enters a specified range just before the lower limit enabling an operation of the motor driving means 70 and performs a processing to indicate a display of "less amount of residual capacity" at the display device 120. When it judges at the step 1 that the residual capacity of the battery 12 is out of the specified range just before the lower limit value, the operation advances to a step 3, where it judges that the residual capacity of the battery 12 is less than the aforesaid lower limit value, the device performs at a step 4 that the engine driving means 71 is operated, and then at a step 5, the display of "the residual capacity is less than the lower limit value" is displayed at the display device 120.

Then, an action of the first preferred embodiment will be described as follows.

When the driving change-over control means 72 judges the motor running mode region M of the mode map 74 in this situation, the motor driving means 70 is operated and the electric motor 19 is set to be operated, so that an output of the electric motor 19 is transmitted to the rear wheel 3r through the transmission device 20 to drive it. Accordingly, the motorcycle 1 becomes the motor running mode.

Under such a motor running mode, when it is judged that the operating state of the motor driving means 70 enters into the critical region Ma adjacent to the engine running mode region E due to either an increasing of the throttle valve opening degree θ or an increasing of the throttle valve opening speed dθ/dt, the motor driving means 70 displays a description of "just before engine running" with either a letter or a mark at the display device 120, so that a driver looks at the display and can acknowledge the aforesaid state. Accordingly, if the driver desires to continue the motor running mode at this time, the driver keeps the opening degree of the throttle valve 23 or gradually decreases a throttle valve opening speed dθ/dt of the throttle valve 23, thereby the driver can hold the operating state of the motor driving means 70, so that the motor running mode of the motorcycle 1 is continued and a silent running state can be held.

In turn, if either the throttle valve opening degree θ or the throttle valve opening speed dθ/dt is rapidly increased to desire an acceleration of the vehicle, the driving change-over control means 72 judges that the operation is changed to the engine running mode region E, operates the engine driving means 71 to cause the engine 15 to be operated, the output of the crank shaft 16 is transmitted to the rear wheel 3r through the continuously variable transmitter 17, one-way clutch 21 and transmission device 20 so as to drive it. Accordingly, the motorcycle 1 becomes the engine running mode to enable the motorcycle 1 to be rapidly accelerated due to an increased output of the engine 15.

In this way, the driving change-over control means 72 determines each of the working regions of the motor driving means 70 and the engine driving means 71 on the basis of the throttle valve opening degree θ attained by a detected signal of the throttle sensor 73 and a throttle valve opening speed dθ/dt attained through its calculation, so that it is possible for the driver's intention to be reflected against the change-over between the motor running mode and the engine running mode of the motorcycle 1.

If the residual capacity of the battery 12 is decreased to such a degree as one in which it enters into the specified range just before the lower limit value enabling an operation of the motor driving means 70 to be carried out under the motor running mode, a description of "a less amount of residual capacity" is displayed at the display device 120, so that the driver can look at the display to acknowledge the reduction in residual capacity of the battery 12.

In addition, when the residual capacity of the battery 12 is less than the lower limit value described above, the driving change-over control means 72 automatically changes over the operation of the motorcycle from its operation under the motor driving means 70 to its operation under the engine driving means 71, so that the engine 15 becomes its operated state and its output is transmitted to the rear wheel 3r and the inner rotor 56 of the electric motor 19. Accordingly, the motorcycle 1 becomes the engine running mode and the electric motor 19 generates electricity to charge the battery 12, so that it is possible to restrict over-charging of the battery 12 to prevent the battery 12 from becoming a zero state of the residual capacity.

At this time, a description of "a residual capacity is less than the lower limit value" is displayed at the display device 120, so that the driver looks at the description and can acknowledge a cause of automatic change-over in operation of the vehicle to the engine running mode.

Then, referring to FIG. 6, a second preferred embodiment of the control mechanism of this invention will be described as follows.

Figure 6:
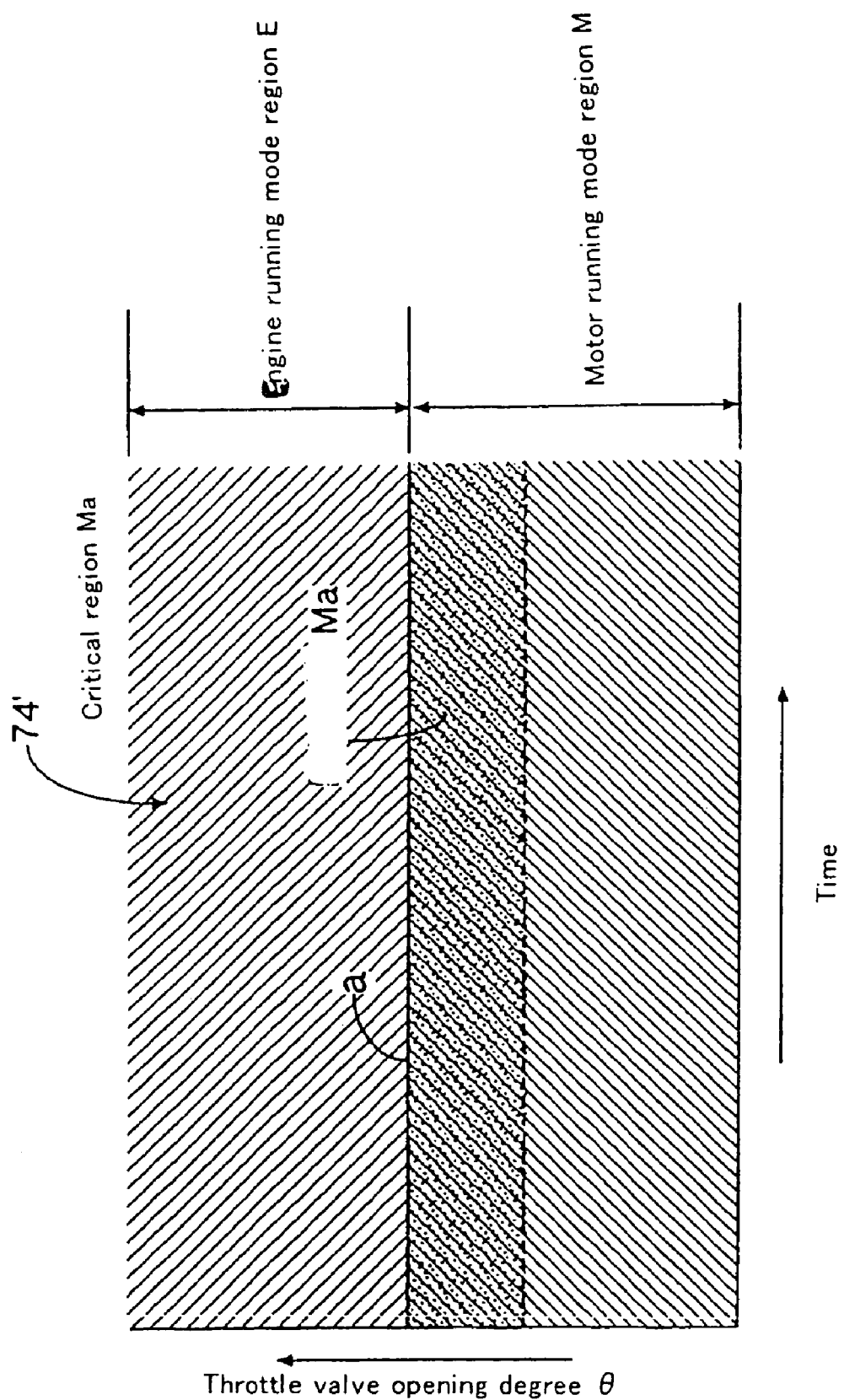
FIG. 6 is a view corresponding to FIG. 4 for showing the second preferred embodiment of this invention.

Since this second preferred embodiment has the same configuration as that of the aforesaid preferred embodiment except the fact that a time is indicated at a lateral axis in the mode map 74, the portions corresponding to those of the preferred embodiment in FIG. 6 are denoted by the same reference symbols and their overlapped description will be eliminated.

According to the second preferred embodiment of this invention, since the motor running mode region M, the critical region Ma and the engine running mode region E are determined in dependent on only the throttle valve opening degree θ, the mode map 74 can be simplified, the function of the driving change-over control means 72 can also be simplified along with the former simplification and a cost reduction can be attained.

This invention is not limited to the aforesaid preferred embodiments, and various modifications in design can be carried out in a scope not departing from the gist of this invention. For example, when the motor driving means 70 is operated in the critical region Ma in the aforesaid preferred embodiments, the driving change-over control means 72 enables the driver to acknowledge it in place of the display device 120, by making an arrangement of a vibrating device such as a vibrator or the like at the steering handlebar 5 as an informing means for informing the driver of a description of "just before engine running" and by vibrating it under the condition described above.

Referring now to FIGS. 7-13, the operations of some preferred embodiments of the display device 120 of this invention will be described in detail.

Figure 7:
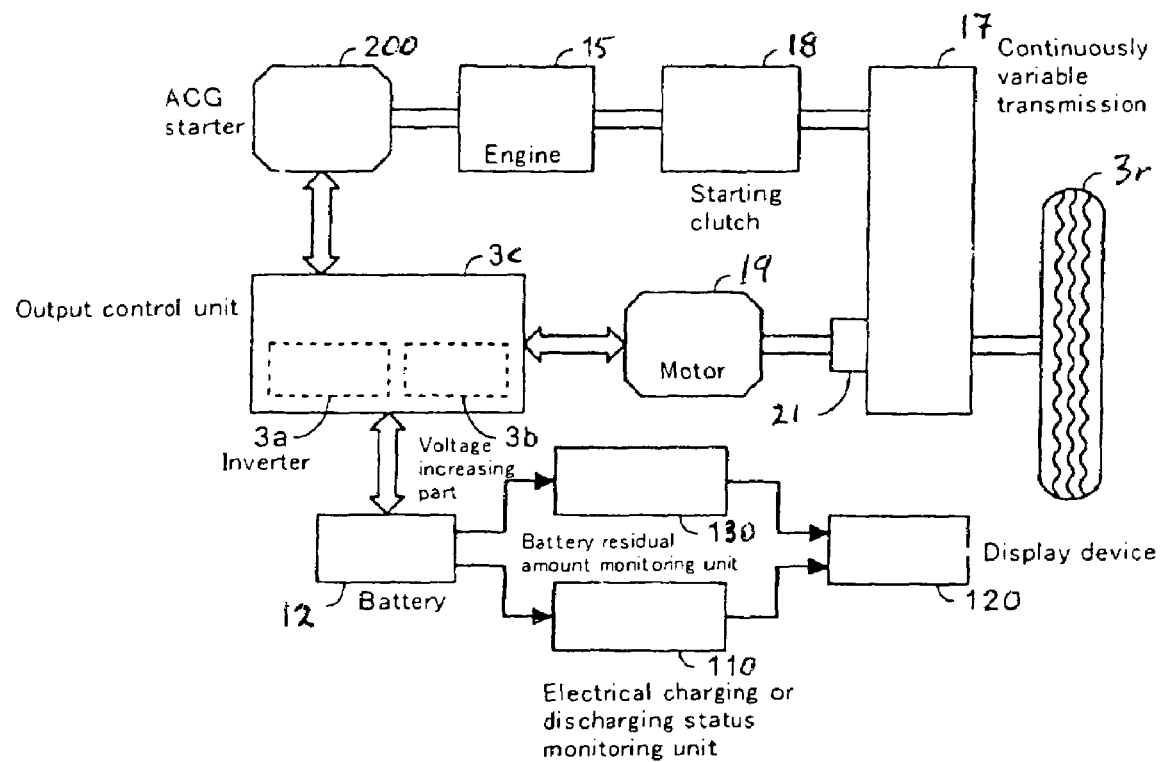
FIG. 7 is a view for showing one example of a system configuration of a hybrid-type vehicle to which this invention is applied.

FIG. 7 is a view for showing one example of a system configuration of the hybrid-type vehicle shown in FIGS. 1 and 2.

A driving side of the continuously variable transmission 17 is connected to the crank shaft of engine 15 through starting clutch 18 and further ACG starter 200 acting as an AC generator also acting as a starter motor. Driving wheel 3r is connected to a driven side of the continuously variable transmission 17 and at the same time electric motor 19 is connected to it through one-way clutch 21. Power generated output of the ACG starter 200 is converted into a proper DC output through an output control unit 3c including an inverter 3a and a voltage increasing unit 3b and charged to the battery 12 and at the same time, it is re-converted into a proper AC output and supplied to the motor 19.

With such a configuration as above, under "electric motor running mode", the DC current outputted from the battery 12 is converted into an AC current through the output control unit 3c and supplied to the motor 19. Under "the series hybrid running mode", the generated electrical power of the ACG starter 200 driven by the engine 15 is converted into a DC current with the output control unit 3c and controlled, further converted into an AC current and supplied to the motor 19. Under "parallel hybrid running mode", the motorcycle runs with the motor 19 under a rotating speed of the engine, lower than 3,000, for example, the starting clutch 18 is connected when the engine rotating speed exceeds 3,000 and then the driving force of the engine 15 is transmitted to the driving wheel 3r through the continuously variable transmission 17.

Under this "parallel hybrid running mode", a transmission characteristic of the continuously variable transmission 17 can be changed over to any one of either "normal mode" or "sports mode". Under "sports mode", it becomes possible to attain a more superior accelerating performance than that attained under "normal mode". The power of the driving wheel 3r is transmitted at the time of regenerative braking operation, and the regenerative current of AC outputted from the motor 19 is converted into a DC at the output control unit 3c and charged to the battery 12.

A battery residual amount monitoring unit 130 detects a charging residual amount E of the battery 12 (sometimes expressed as a battery residual amount E) on the basis of either the terminal voltage or charging and discharging history of the battery 12. The charging and discharging monitoring unit 110 detects both a charging current supplied from the output control unit 3c to the battery 12 and a discharging current supplied from the battery 12 to the output control unit 3c. Both the result of detection of the charging residual amount and the charging and discharging status is displayed at a display device 120.

Figure 8:
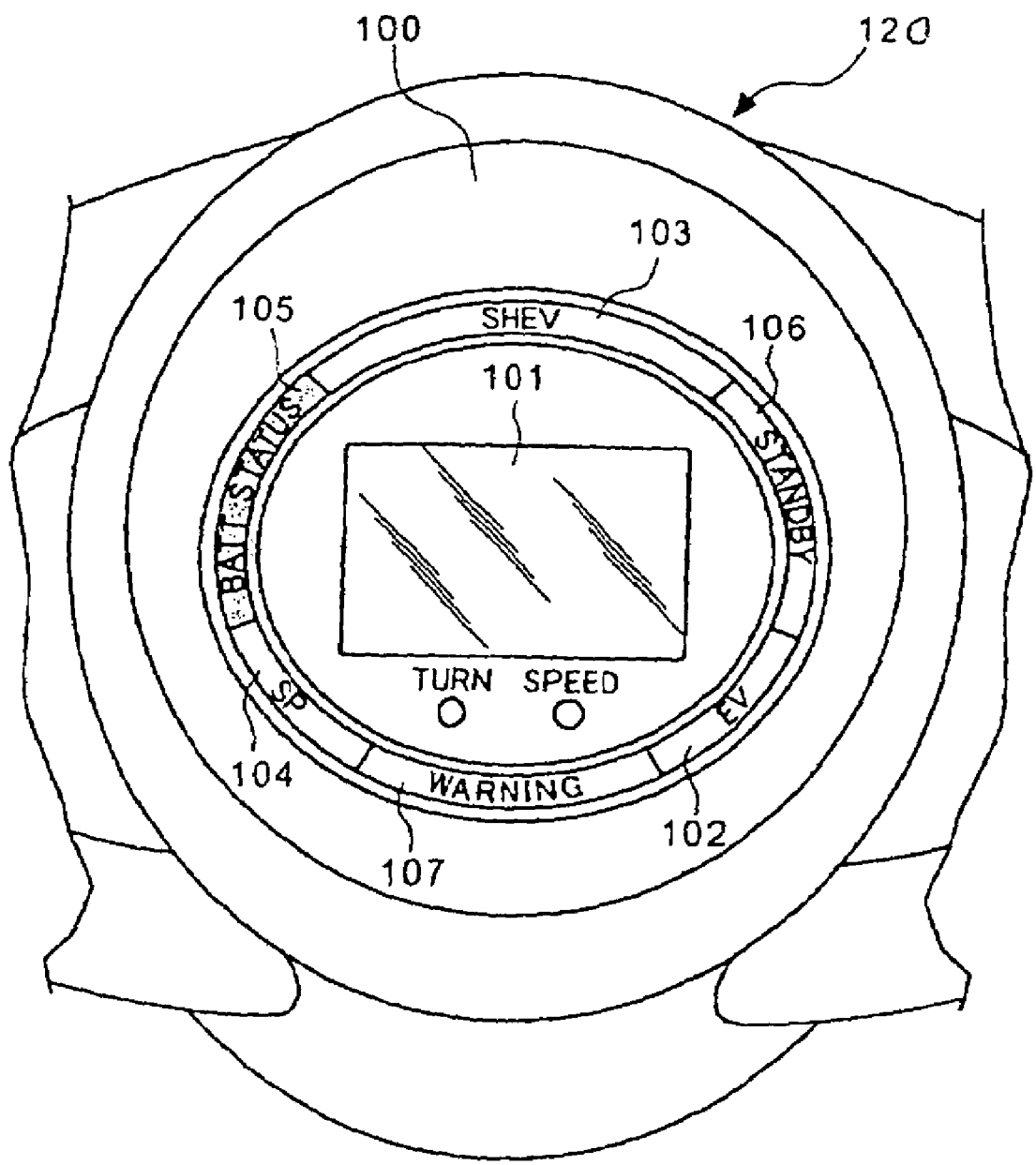
FIG. 8 is a front elevational view for showing a display device.

FIG. 8 is a front elevational view for showing the display device 120. A speed display part 101 displaying the running speed is arranged at the central part of the display surface 100. A plurality of running mode indicators 102, 103, 104 for displaying the running mode respectively and vehicle state indicators 105, 106 and 107 displaying a driving condition are arranged in an annular manner around the speed display part 101. Each of the indicators is formed in a substantial arcuate shape and they are arranged in an endless manner around the speed display part 101. Display colors at a plurality of running mode indicators 102 to 104 and the vehicle state indicators 105 to 107 are different from each other.

The running mode indicator 102 is turned on under the electric motor running mode (EV mode). The running mode indicator 103 is turned on under the series hybrid running mode (SHEV mode). The running mode indicator 104 is turned on under the parallel hybrid running mode where a transmission characteristic of the continuously variable transmission 17 is under a sports mode (SP mode).

As described in detail as follows, the operating state indicator 105 is illuminated or turned on under a color and a duty ratio corresponding to the charging residual amount and the charging and discharging state (BTT STATUS) of the battery 4. The operation state indicator 106 is turned on under a standby state. The operation state indicator 107 is turned on when a warning is generated.

Figures 9, 10:
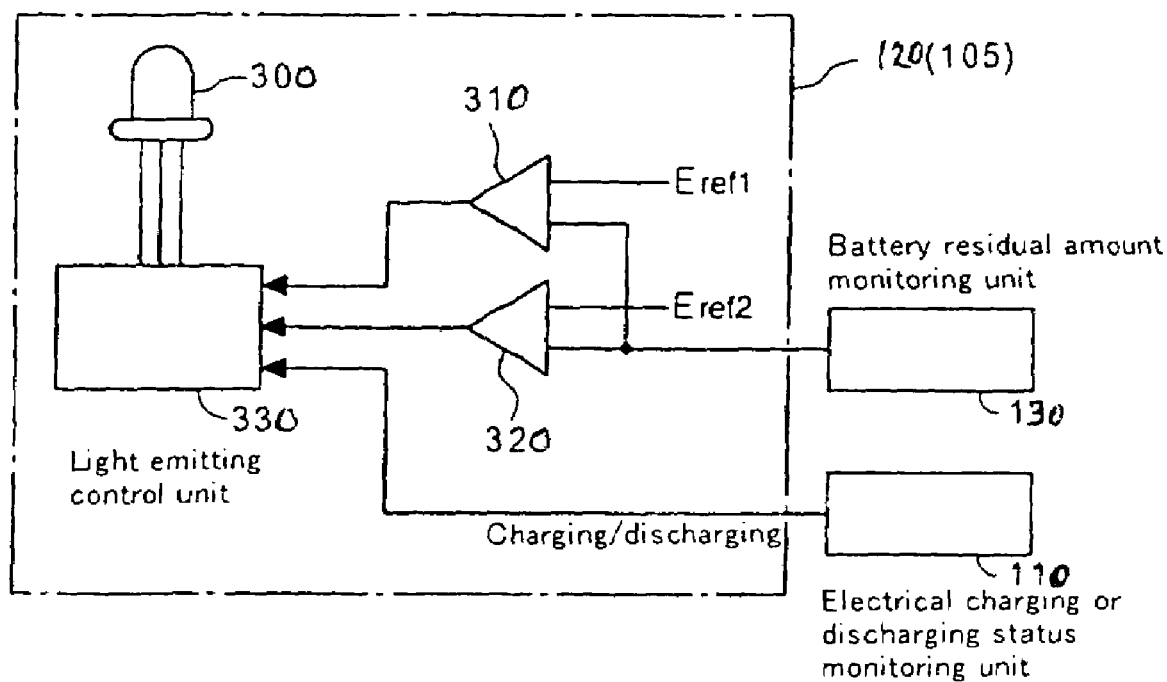
FIG. 9 is a block diagram for showing a driving circuit for emitting light of a two-color LED in response to a residual amount of battery.
FIG. 10 is a view for showing a control state of a first preferred embodiment of a light emitting control.

FIG. 9 is a block diagram for showing a configuration of a driving circuit for light emitting at the operation state indicator 105, this circuit includes two-color LED 300 having two anodes and one cathode capable of selectively emitting light of green color and red color, a first comparator 310 for comparing the charging residual amount detected by the battery residual amount monitoring unit 130 with a first reference value Eref1 and outputting the result of comparison, a second comparator 320 for comparing the charging residual amount E with a second reference value Eref2 (<Eref1) and outputting the result of comparison, and the light emitting control part 330 for controlling a light emitting on the basis of the output of each of the comparators 310, 320 and a result of monitoring of the charging and discharging monitoring part 110.

The first and second reference values Eref1 and Eref2 are an upper limit value and a lower limit value in the charging residual amount where the light emitting control of the operating state indicator 105. If the charging residual amount is less than the first reference value and more than the second reference value, a light emitting control for the two-colors LED 300 is carried out in response to the charging residual amount and the charging and discharging state of the battery.

FIG. 10 is a view for showing a control form the first preferred embodiment of the light emitting control. The two-color LED 300 is turned off without having any relation with the charging and discharging state of the battery 12 if the battery residual amount E exceeds the first reference value Eref1 or does not satisfy the second reference value Eref2. To the contrary, if the battery residual amount E is present between the first reference value Eref1 and the second reference value Eref2, it is turned on with a color corresponding to the charging and discharging state of the battery 12. In this preferred embodiment, if the charging operation is being carried out, it is turned on with green color and in turn if the battery is discharging, this is turned on with red color in order to promote an attention to a riding person.

Figure 11:
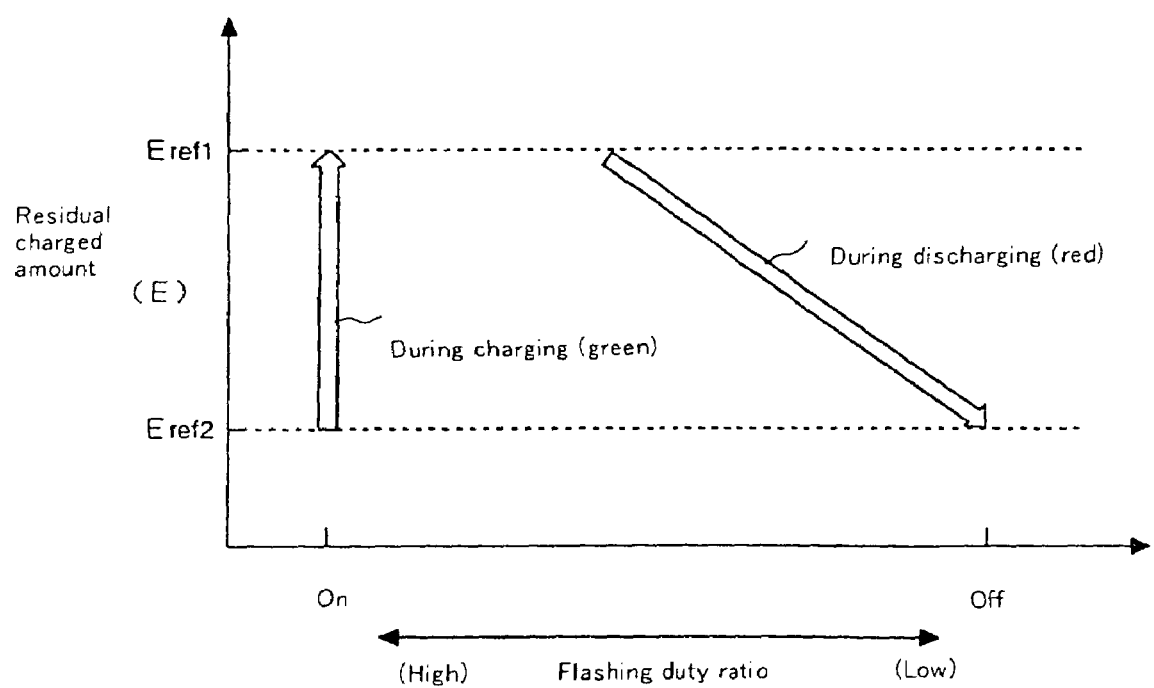
FIG. 11 is a view for showing a control state of a second preferred embodiment of a light emitting control.

FIG. 11 is a view for showing a controlling form of the second preferred embodiment of the light emitting control, where if the battery residual amount E exceeds the first reference value Eref1 or does not reach to the second reference value Eref2, the two-color LED 300 is turned off without having any relation with the charging and discharging state of the battery 12. To the contrary, if the battery residual amount E is present between the first reference value Eref1 and the second reference value Eref2, the two-color LED 300 is controlled for its light emitting operation in response to the charging and discharging state of the battery 12. In this preferred embodiment, if the battery is being charged, it is turned on with green color and in turn if the battery is being discharged, it is illuminated to emit light with red color under a duty ratio where a turned-on term is extended as a large charging residual amount is present.

Figure 12:
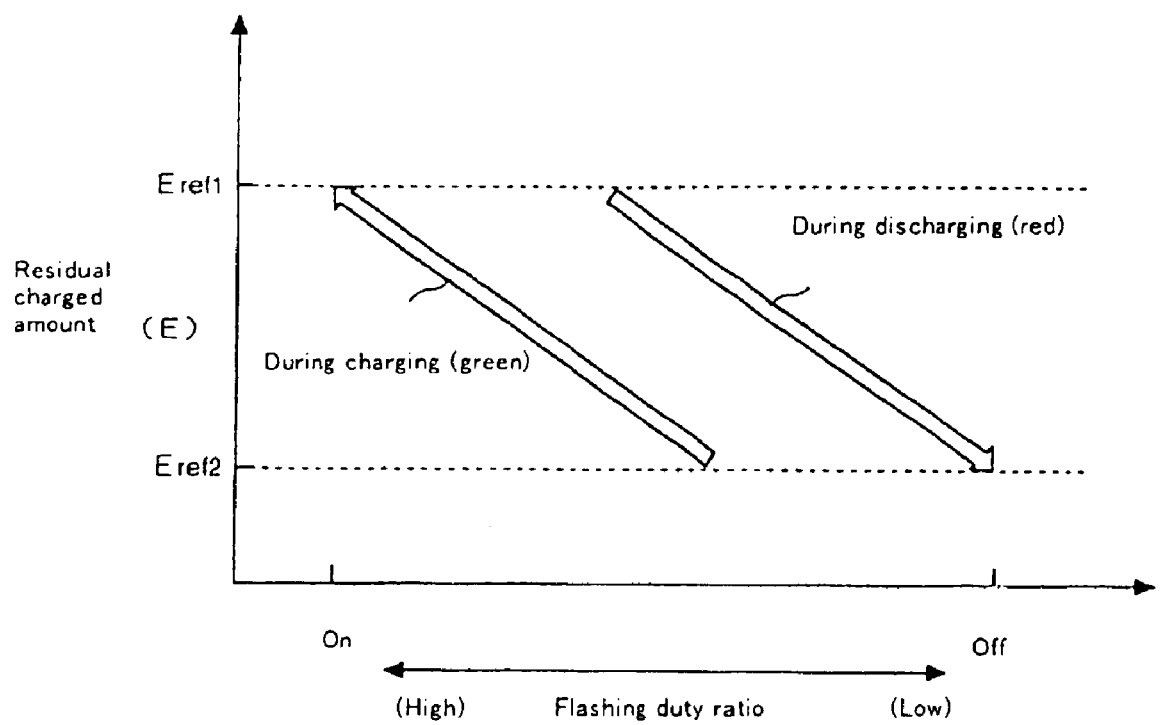
FIG. 12 is a view for showing a control state of a third preferred embodiment of a light emitting control.

FIG. 12 is a view for showing a controlling form of a third preferred embodiment of the light emitting control, wherein if the battery residual amount E exceeds the first reference value Eref1 or does not reach to the second reference value Eref2, the two-color LED 300 is turned off without having any relation with the charging and discharging state of the battery 12. To the contrary, the two-color LED 300 is controlled for its light emitting operation in response to the charging and discharging state of the battery 12 if the battery residual amount E is present between the first reference value Eref1 and the second reference value Eref2. In this preferred embodiment, if the charging operation is being carried out, it is illuminated for its light emitting in green color with a variable duty ratio where the turning-on term is extended as the charging residual amount E is increased. If it is being discharged, it is illuminated for its light emitting in red color with a duty ratio where the turning-on term is extended as the charging residual amount E is increased in the same manner as that of the second preferred embodiment.

Figure 13:
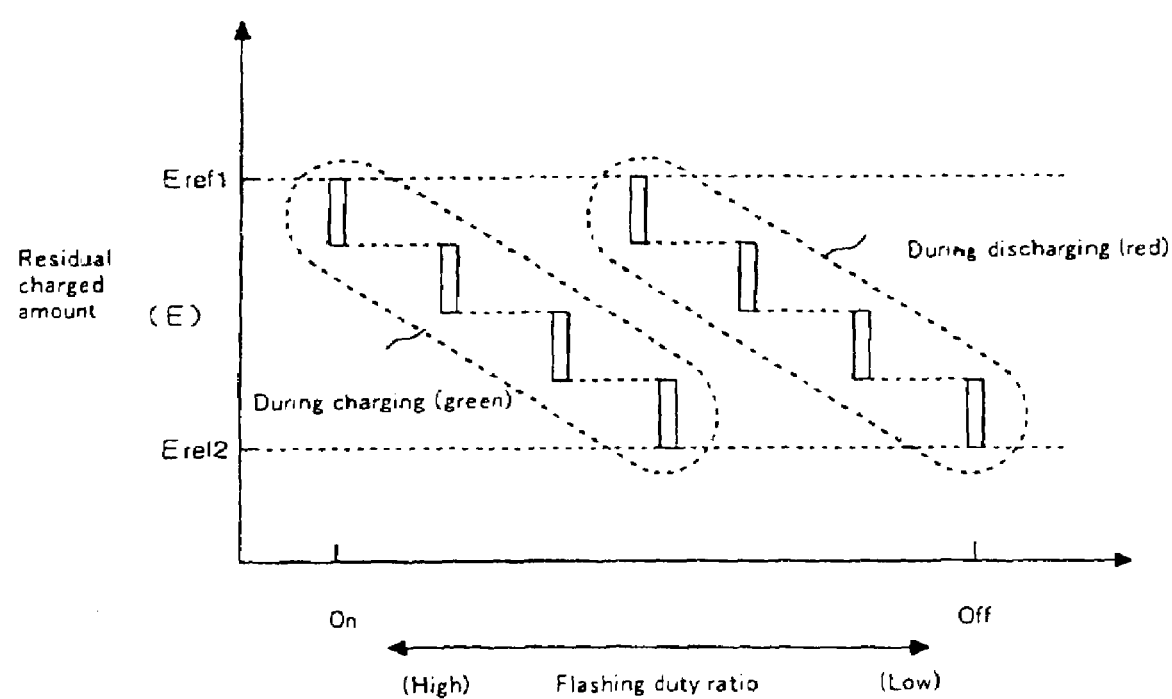
FIG. 13 is a view for showing a control state of a fourth preferred embodiment of a light emitting control.

FIG. 13 is a view for showing a controlling form of a fourth preferred embodiment of the light emitting control, wherein if the battery residual amount E exceeds the first reference value Eref1 or does not reach to the second reference value Eref2, the two-color LED 300 is turned off without having any relation with the charging and discharging state of the battery 12. To the contrary, the two-color LED 300 is controlled for its light emitting operation in response to the charging and discharging state of the battery 12 if the battery residual amount E is present between the first reference value Eref1 and the second reference value Eref2. Also In this preferred embodiment, if the charging operation is being carried out in the same manner as that of the third preferred embodiment, it is illuminated for its light emitting in green color with a duty ratio where the turning-on term is extended as the charging residual amount E is increased. If it is being discharged, it is illuminated for its light emitting in red color with a duty ratio where the turning-on term is extended as the charging residual amount E is increased in the same manner as that of the second preferred embodiment. However, in this preferred embodiment, this is different from the third preferred embodiment in view of the facts that the variation in duty ratio is not attained continuously but attained in a stepwise manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control mechanism for a hybrid vehicle comprising a motor driving means enabling a running of the vehicle through an output of an electric motor, an engine driving means enabling the running of the vehicle through an output of an engine, a throttle sensor for sensing an opening degree of a throttle valve of the engine, and a driving change-over control means having a mode map for determining each of working regions (M, E) of the motor driving means and the engine driving means in response to a sensing signal (θ) of the throttle sensor, wherein said mode map is provided with a critical region (Ma) adjacent to the working region (E) of the engine driving means in the working region (M) of the motor driving means and an informing means for informing a driver of a fact that the motor driving means is being operated in the critical region (Ma), wherein the critical region (Ma) of the mode map is limited to a predetermined maximum value (a) of the sensing signal (θ) of the throttle sensor, and by a predetermined maximum value (b) of an opening speed (dθ/dt) of the throttle valve.

2. The control mechanism for a hybrid vehicle according to claim 1, wherein said mode map is constituted for determining each of the working regions (M, B) of the motor driving means and the engine driving means in reference to the opening speed (dθ/dt) of the throttle valve in addition to the sensing signal (θ) of the throttle sensor.

3. The control mechanism for a hybrid vehicle according to claim 1, wherein the driving change-over control means detects a residual capacity of a battery and informs it to a driver through said informing means when it is determined that the residual capacity approaches to a lower limit value enabling an operation of the motor driving means to be carried out.

4. The control mechanism for a hybrid vehicle according to claim 2, wherein the driving change-over control means detects a residual capacity of a battery and informs it to a driver through said informing means when it is determined that the residual capacity approaches to a lower limit value enabling an operation of the motor driving means to be carried out.

5. The control mechanism for a hybrid vehicle according to claim 3, wherein the driving change-over control means is constituted such that the driving change-over control means automatically changes it to an operation of the engine driving means when it is determined that the residual capacity of the battery is decreased under the lower limit value enabling the operation of the motor driving means to be carried out under an operation of the motor driving means.

6. The control mechanism for a hybrid vehicle according to claim 2, wherein the informing means is a display device that includes an indicator for emitting light in response to a charging and discharging status of a battery, and wherein said indicator can selectively emit light of at least two colors, and said display device includes a light emitting control means to cause said indicator to emit light with a first color if said battery is being charged and to cause said indicator to emit light with a second color if said battery is being discharged.

7. The control mechanism for a hybrid vehicle according to claim 6, wherein said display device further comprises a battery residual amount monitoring means for monitoring a residual charged amount of said battery, and said light emitting control means performs said light emitting control when the charging residual amount of the battery is in a specified range.

8. The control mechanism for a hybrid vehicle according to claim 7, wherein said light emitting control means illuminates to emit light of said indicator with the second color when the battery is being discharged and a duty ratio of said illumination light emitting is varied in response to the charging residual amount of said battery.

9. The control mechanism for a hybrid vehicle according to claim 8, wherein said light emitting control means illuminates to emit light of said indicator with the first color when the battery is being charged and a duty ratio of said illumination light emitting is varied in response to the charging residual amount of said battery.

10. The control mechanism for a hybrid vehicle according to claim 8, wherein a duty ratio of said illumination emitted light is varied in a stepwise manner in response to the charging residual amount of said battery.

11. A control mechanism for a hybrid vehicle having a motor driving means enabling a running of the vehicle through an output of an electric motor, and an engine driving means enabling the running of the vehicle through an output of an engine, the control mechanism comprising:

a throttle sensor for sensing an opening degree of a throttle valve of the engine;

driving change-over control means having a mode map for determining each of working regions (M, E) of the motor driving means and the engine driving means in response to a sensing signal ($\theta$) of the throttle sensor, wherein said mode map is provided with a critical region (Ma) adjacent to the working region (E) of the engine driving means in the working region (M) of the motor driving means and an informing means for informing a driver of a fact that the motor driving means is being operated in the critical region (Ma), wherein the critical region (Ma) of the mode map is limited to a predetermined maximum value (a) of the sensing signal ($\theta$) of the throttle sensor, and by a predetermined maximum value (b) of an opening speed (d$\theta$/dt) of the throttle valve.

12. The control mechanism for a hybrid vehicle according to claim 11, wherein said mode map is constituted for determining each of the working regions (M, E) of the motor driving means and the engine driving means in reference to the opening speed (d$\theta$/dt) of the throttle valve in addition to the sensing signal ($\theta$) of the throttle sensor.

13. The control mechanism for a hybrid vehicle according to claim 11, wherein the driving change-over control means detects a residual capacity of a battery and informs it to a driver through said informing means when it is determined that the residual capacity approaches to a lower limit value enabling an operation of the motor driving means to be carried out.

14. The control mechanism for a hybrid vehicle according to claim 12, wherein the driving change-over control means detects a residual capacity of a battery and informs it to a driver through said informing means when it is determined that the residual capacity approaches to a lower limit value enabling an operation of the motor driving means to be carried out.

15. The control mechanism for a hybrid vehicle according to claim 13, wherein the driving change-over control means is constituted such that the driving change-over control means automatically changes it to an operation of the engine driving means when it is determined that the residual capacity of the battery is decreased under the lower limit value enabling the operation of the motor driving means to be carried out under an operation of the motor driving means.

16. The control mechanism for a hybrid vehicle according to claim 12, wherein the informing means is a display device that includes an indicator for emitting light in response to a charging and discharging status of a battery, and wherein said indicator can selectively emit light of at least two colors, and said display device includes a light emitting control means to cause said indicator to emit light with a first color if said battery is being charged and to cause said indicator to emit light with a second color if said battery is being discharged.

17. The control mechanism for a hybrid vehicle according to claim 16, wherein said display device further comprises a battery residual amount monitoring means for monitoring a residual charged amount of said battery, and said light emitting control means performs said light emitting control when the charging residual amount of the battery is in a specified range.

18. The control mechanism for a hybrid vehicle according to claim 17, wherein said light emitting control means illuminates to emit light of said indicator with the second color when the battery is being discharged and a duty ratio of said illumination light emitting is varied in response to the charging residual amount of said battery.

19. The control mechanism for a hybrid vehicle according to claim 18, wherein said light emitting control means illuminates to emit light of said indicator with the first color when the battery is being charged and a duty ratio of said illumination light emitting is varied in response to the charging residual amount of said battery.

20. The control mechanism for a hybrid vehicle according to claim 18, wherein a duty ratio of said illumination emitted light is varied in a stepwise manner in response to the charging residual amount of said battery.

* * * * *